United States Patent
Pulkin et al.

(10) Patent No.: US 11,873,262 B2
(45) Date of Patent: Jan. 16, 2024

(54) INORGANIC BINDER SYSTEM COMPRISING BLAST FURNACE SLAG AND SOLID ALKALI METAL SILICATE

(71) Applicant: SIKA TECHNOLOGY AG, Baar (CH)

(72) Inventors: Maxim Pulkin, Trostberg (DE); Maria Müller, Trostberg (DE); Steffen Wache, Trostberg (DE)

(73) Assignee: SIKA TECHNOLOGY AG, Baar (CH)

( * ) Notice: Subject to any disclaimer, the term of this patent is extended or adjusted under 35 U.S.C. 154(b) by 298 days.

(21) Appl. No.: 17/275,833

(22) PCT Filed: Sep. 10, 2019

(86) PCT No.: PCT/EP2019/074089
§ 371 (c)(1),
(2) Date: Mar. 12, 2021

(87) PCT Pub. No.: WO2020/053201
PCT Pub. Date: Mar. 19, 2020

(65) Prior Publication Data
US 2022/0041503 A1    Feb. 10, 2022

(30) Foreign Application Priority Data
Sep. 13, 2018   (EP) .................................... 18194299

(51) Int. Cl.
C04B 7/153    (2006.01)
C04B 28/26    (2006.01)
C04B 111/00   (2006.01)

(52) U.S. Cl.
CPC ............ C04B 7/1535 (2013.01); C04B 28/26 (2013.01); *C04B 2111/00637* (2013.01)

(58) Field of Classification Search
CPC .................. C04B 7/1535; C04B 28/26; C04B 2111/00637; C04B 2111/00146; C04B 2111/00672; C04B 2111/28; C04B 2111/62; C04B 2111/70; C04B 2111/72
See application file for complete search history.

(56) References Cited

U.S. PATENT DOCUMENTS

| | | | | | |
|---|---|---|---|---|---|
| 4,961,787 A | * | 10/1990 | Majumdar | .............. | C04B 28/06 106/695 |
| 5,022,925 A | * | 6/1991 | Surguchev | .............. | C04B 28/26 106/631 |
| 2012/0304894 A1 | * | 12/2012 | Abdullah | ................ | C04B 28/26 524/2 |

FOREIGN PATENT DOCUMENTS

| | | | |
|---|---|---|---|
| CN | 103693886 A | | 4/2014 |
| CN | 103755306 A | * | 4/2014 |
| CN | 105622005 A | * | 6/2016 |
| DE | 1302386 B | * | 7/1971 |
| EP | 1081114 A1 | | 3/2001 |
| EP | 1236702 A1 | | 9/2002 |
| EP | 2504296 A1 | | 10/2012 |
| EP | 2616610 A1 | | 7/2013 |
| EP | 3063100 A1 | | 9/2016 |
| RU | 2007111080 A | | 10/2008 |
| RU | 2346904 C2 | | 2/2009 |
| WO | 2011064005 A1 | | 6/2011 |
| WO | 2012035455 A1 | | 3/2012 |
| WO | 2015062860 A1 | | 3/2015 |

OTHER PUBLICATIONS

S. Roy, et al., "Investigation of Portland Slag Cement Activated by Waterglass", Cement and Concrete Research, 1998, pp. 1049-1056, vol. 28, Issue 7, Elsevier Science Ltd.
International Search Report for Application No. PCT/EP2019/074089 dated Oct. 16, 2019.
Written Opinion for Application No. PCT/EP2019/074089 dated Oct. 16, 2019.

\* cited by examiner

*Primary Examiner* — Anthony J Green
(74) *Attorney, Agent, or Firm* — Oliff PLC

(57) ABSTRACT

The present invention relates to an inorganic binder system comprising blast furnace slag, and at least one solid alkali metal silicate, wherein the inorganic binder system is obtainable by co-grinding a mixture comprising the blast furnace slag and the at least one solid alkali metal silicate.

19 Claims, No Drawings

INORGANIC BINDER SYSTEM COMPRISING BLAST FURNACE SLAG AND SOLID ALKALI METAL SILICATE

CROSS REFERENCE TO RELATED APPLICATIONS

This application is a national stage application of International Application No. PCT/EP2019/074089, filed 10 Sep. 2019, which claims priority from European Patent Application No. 18194299.6, filed 13 Sep. 2018, both of which applications are incorporated herein by reference.

The present invention relates to an inorganic binder system, a process for preparing the inorganic binder system, the use of the inorganic binder system and a cement, a mortar and a concrete.

Certain slags from metallurgical processes can be activated with strong alkalis, such as, for example, alkali metal silicates. These alkali metal silicates are commonly known as water glasses and are termed according to the respective alkali metal, e.g. sodium water glass or potassium water glass.

EP 2616610 A1 relates to the use of a binder system for producing a hydrophilic building product, wherein the binder system comprises hydraulic, latent hydraulic and/or pozzolanic binders and also alkali metal silicate, wherein the hydraulic binder is selected from among portland cements, aluminate cements and mixtures thereof.

EP 2504296 A1 relates to a binder system comprising at least one latent hydraulic binder, at least one amorphous silica, optionally at least one reactive filler and at least one alkali metal silicate. It was found that this binder system hardens in the form of a hybrid matrix which is acid-resistant, water-resistant and alkali-resistant. The binder system can be used for the production of a hydraulically setting mortar.

EP 3063100 A1 relates to a geopolymer foam formulation, comprising at least one inorganic binder, selected from the group comprising latently hydraulic binders, pozzolanic binders, and mixtures thereof; at least one alkaline activator, selected from the group comprising alkali metal hydroxides, alkali metal carbonates, alkali metal aluminates, alkali metal silicates, and mixtures thereof; at least one surfactant, selected from the group comprising anionic surfactants, cationic surfactants, non-ionic surfactants, and mixtures thereof; a gas phase; and water.

EP 1236702 A1 relates to a building material mixture for the production of chemically resistant mortars, wherein the building material mixture comprises water glass.

EP 1081114 A1 relates to a building material mixture containing water glass powder, a water glass hardener, a latent hydraulic binder and an inorganic filler.

Commonly, aqueous potassium water glass, aqueous sodium water glass, or combinations thereof are used for the activation of blast furnace slag in binder systems and mortars, wherein a high early strength may be achieved particularly by using sodium water glass. Particularly suitable is the use of aqueous potassium water glass and aqueous sodium water glass having a low modulus.

It has surprisingly been found that activation of blast furnace slag in binder systems is possible with solid alkali metal silicates. Furthermore, it has been found that the activation is also possible with solid alkali metal silicates having a rather high modulus.

Without being bound by theory, it is believed that the activation of blast furnace slag with solid alkali metal silicates is due to the formation of seed crystals when co-grinding the solid alkali metal silicates with the blast furnace slag.

It has further been found that in an inorganic binder system comprising blast furnace slag, and at least one solid alkali metal silicate having the empirical formula m $SiO_2$.n $M_2O$, wherein the inorganic binder system is obtainable by co-grinding the at least one inorganic binder and the at least one solid alkali metal silicate, has improved mechanical properties as well as improved resistance against acids, bases and water.

In one embodiment, the present invention is directed to an inorganic binder system comprising
 (i) blast furnace slag, and
 (ii) at least one solid alkali metal silicate having the empirical formula m $SiO_2$.n $M_2O$, wherein M is selected from the group consisting of Li, Na, K and mixtures thereof,
 and wherein the inorganic binder system is obtainable by co-grinding a mixture comprising the blast furnace slag and the at least one solid alkali metal silicate.

In another embodiment, the present invention is directed to a process for the manufacture of the inorganic binder system comprising co-grinding a mixture comprising
 (i) the blast furnace slag, and
 (ii) the at least one solid alkali metal silicate,
 and optionally mixing the obtained co-ground mixture with at least one additional inorganic binder and/or at least on additive, to obtain the inorganic binder system.

In yet another embodiment, the present invention is directed to the use of the inorganic binder system for improving the mechanical properties and/or the durability of construction materials.

In yet another embodiment, the present invention is directed to the use of the inorganic binder system according to the present invention as or as a constituent of building material formulations and/or building products such as concrete, finished concrete parts, concrete goods, concrete blocks and also on-site concrete, sprayed concrete, ready-mixed concrete, building adhesives and thermal insulation composite system adhesives, concrete repair systems, one-component and two-component sealing slurries, screeds, knifing fillers and self-levelling compositions, tile adhesives, plasters and renders, adhesives and sealants, coating systems, in particular for tunnels, wastewater channels, spray protection and condensate lines, dry mortars, joint grouts, drainage mortars and/or repair mortars.

In yet another embodiment, the present invention is directed to a cement, mortar or concrete containing the inorganic binder system according to the present invention.

In the context of the present invention, the following definitions are relevant.

For the purpose of the present invention, alkali metal silicates having the empirical formula m $SiO_2$.n $M_2O$, wherein M is selected from the group consisting of Li, Na, K, are also referred to as "lithium water glass", "sodium water glass", and "potassium water glass", respectively. Furthermore, sodium silicate is herein referred to as "sodium water glass" and potassium silicate is herein referred to as "potassium water glass".

The term "wt.-%" or "% by weight" (also called mass fraction) denotes the percentage of the respective component in relation to the sum of all components by weight, unless otherwise stated. The term "vol.-%" or "% by volume" refers to the percentage of each component in proportion to the sum of all components by volume, unless otherwise specified. Furthermore, the sum of all percentages of the specified and unspecified components of a composition is always 100%.

The terms "comprising" and "containing" mean that in addition to the specific features mentioned, further, not specifically mentioned features may be present. The term "consisting of" means that only the specific features mentioned are included. The terms "comprising" and "containing" are meant to always include the possibility of being restricted to "consisting of", should necessity arise.

The term "water" as used herein may refer to pure, deionized water or water with up to 0.1% by weight impurities and/or salts, such as normal tap water.

The preferred embodiments of the invention will be explained below. The preferred embodiments are preferred alone and in combination with each other.

As already stated above, the present invention is directed to an inorganic binder system comprising
(i) blast furnace slag, and
(ii) at least one solid alkali metal silicate having the empirical formula m $SiO_2 \cdot n$ $M_2O$, wherein M is selected from the group consisting of Li, Na, K and mixtures thereof,
and wherein the inorganic binder system is obtainable by co-grinding a mixture comprising the blast furnace slag and the at least one solid alkali metal silicate.

As used herein, the term "slag" refers to the by-product of a smelting process, or synthetic slag. The main use of a smelting process is to convert an ore, scrap or a material mixture containing different metals into a form from which the desired metals can be skimmed as a metal layer and the undesired metal oxides, e.g. silicates, alumina, etc., remain as the slag.

Blast furnace slag (BFS) is formed as a by-product during the smelting of iron ore in the blast-furnace. Similar materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2 kg^{-1}$, preferably from 300 to 600 $m^2 kg^{-1}$. Finer milling gives higher reactivity. For the purposes of the present invention, the expression "blast furnace slag" is however intended to comprise materials resulting from all of the levels of treatment, milling, and quality mentioned (i.e. BFS, GBFS and GGBFS).

Blast furnace slag generally comprises from 30 to 45% by weight of CaO, about 4 to 17% by weight of MgO, about 30 to 45% by weight of S102 and about 5 to 15% by weight of $Al_2O_3$, typically about 40% by weight of CaO, about 10% by weight of MgO, about 35% by weight of $SiO_2$ and about 12% by weight of $Al_2O_3$.

In order to achieve the objects of the present invention, the m:n ratio (also termed "modulus") of the alkali metal silicate having the empirical formula m $SiO_2 \cdot n$ $M_2O$ should preferably not exceed certain values. In a preferred embodiment, the molar ratio of m:n is ≤4.0. Preferably, the molar ratio of m:n is ≤3.8.

In a preferred embodiment, the weight ratio of the blast furnace slag and the at least one solid alkali metal silicate is in the range from 500:1 to 1:5, preferably from 100:1 to 1:2, more preferably from 30:1 to 1:1.

One way of describing the fineness of inorganic binders is the specific surface area. One common method for characterizing the surface area of inorganic binders is the Blaine air permeability test, which is described by the standard DIN EN 196-6. This test is based on the fact that the rate at which air can pass through a porous bed of particles under a given pressure gradient is a function of the surface area of the powder. A chamber of known cross sectional area and volume is filled with a known mass of inorganic binder, and then the time required to pass a known volume of air through the powder is measured. While the surface area can in theory be calculated explicitly from this data, in practice the surface area is determined through an empirical equation developed by measuring powders of a known surface area using the same instrument. The resulting value is called the Blaine value, which is expressed in units of $m^2/kg$.

In a preferred embodiment, the inorganic binder system has a Blaine value in the range from 200 to 1000 $m^2/kg$, preferably in the range from 300 to 800 $m^2/kg$, as determined according to DIN EN 196-6.

Co-grinding of the mixture comprising the blast furnace slag and the at least one solid alkali metal silicate can be performed using any kind of suitable grinding process, for example by using a ball mill, a planetary ball mill, a disc mill, a rotor mill, a vertical mill or a mortar grinder. Preferably, co-grinding of the mixture comprising the blast furnace slag and the at least one solid alkali metal silicate is performed using a ball mill or a vertical mill.

In a preferred embodiment, the blast furnace slag is granulated blast furnace slag or ground granulated blast furnace slag.

In a preferred embodiment, the inorganic binder system further comprises at least one additional inorganic binder selected from the group consisting of hydraulic binders, latent hydraulic binders, pozzolanic binders and mixtures thereof.

Preferably, the pozzolanic binder is selected from the group consisting of precipitated silica, pyrogenic silica, microsilica, ground glass, brown coal fly ash, mineral coal fly ash, metakaolin, pozzolana, tuff, trass, volcanic ash, natural and synthetic zeolites and mixtures thereof.

It is well known that inorganic binder systems can be based on reactive water-insoluble compounds based on $SiO_2$ in conjunction with $Al_2O_3$ which harden in an aqueous alkaline environment. Binder systems of this type are termed inter alia "geopolymers" and are described by way of example in U.S. Pat. No. 4,349,386, WO 85/03699 and U.S. Pat. No. 4,472,199. Materials that can be used as reactive oxide or reactive oxide mixture here are inter alia microsilica, metakaolin, aluminosilicates, fly ash, activated clay, pozzolans or a mixture thereof. The alkaline environment used to activate the binders includes aqueous solutions of alkali metal carbonates, alkali metal fluorides, alkali metal hydroxides, alkali metal aluminates and/or alkali metal silicates, e.g. soluble waterglass. Geopolymers can be less costly and more robust than Portland cement and can have a more advantageous $CO_2$ emission balance.

For the purposes of the present invention, a "latent hydraulic binder" is preferably a binder in which the molar ratio (CaO+MgO):$SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof, and the "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, natural and synthetic zeolites and mixtures thereof.

Amorphous silica is preferably an X-ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Microsilica is a fine powder, mainly comprising amorphous $SiO_2$ powder and is a by-product of silicon or ferrosilicon production. The particles have a diameter of about 100 nm and a specific surface area of from about 15 to about 30 $m^2 g^{-1}$.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2 g^{-1}$.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly, pure metakaolin comprises about 54% by weight of $SiO_2$ and about 46% by weight of $Al_2O_3$.

Aluminosilicates are minerals comprising aluminum, silicon, and oxygen, which may be expressed by referring to the $SiO_2$ and $Al_2O_3$ content. They are a major component of kaolin and other clay minerals. Andalusite, kyanite, and sillimanite are naturally occurring aluminosilicate minerals that have the composition $Al_2SiO_5$.

Fly ash is produced inter alia during the combustion of coal in power stations, and comprises fine particles of varying composition. The main ingredients of fly ash are silicon oxide, aluminum oxide, and calcium oxide. Class C fly ash (brown-coal fly ash) comprises according to WO 08/012438 about 10 wt.-% CaO, whereas class F fly ash (hard-coal fly ash) comprises less than 8% by weight, preferably less than 4% by weight, and typically about 3% by weight of CaO.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

An overview of suitable raw materials for geopolymers is found by way of example in Caijun Shi, Pavel V. Krivenko, Della Roy, Alkali-Activated Cements and Concretes, Taylor & Francis, London & New York, 2006, pp. 6-63.

Preferably, the hydraulic binder is selected from among portland cements, aluminate cements, calcium sulfoaluminate cement and mixtures thereof.

Cement is an inorganic, finely milled hydraulic binder. The different types of cement are classified according to DIN EN 197-1 (November 2011) into the categories CEM I-CEM V. These different cements vary from each other in their stability towards various corrosives and these cements therefore have different applications.

CEM I cement, also called Portland cement, contains about 70 wt.-% CaO and MgO, about 20 wt.-% $SiO_2$, about 10 wt.-% $Al_2O_3$ and $Fe_2O_3$. This cement is obtained by milling and baking limestone, chalk and clay. CEM II cement is Portland cement with a low (about 6 to about 20 wt.-%) or moderate (about 20 to about 35 wt.-%) amount of additional components. This cement may further contain blast-furnace slag, fumed silica (10 wt.-% at most), natural pozzolans, natural calcined pozzolans, fly ash, burnt shale, or mixtures thereof. CEM III cement, also called blast-furnace cement, is comprised of Portland cement and contains 36 to 85 wt.-% of slag. CEM IV cement, also called pozzolanic cement, contains next to Portland cement 11 to 65% of mixtures of pozzolans, silica fume and fly ash. CEM V cement, also called composite cement, contains next to Portland cement 18 to 50 wt.-% of slag, or mixtures of natural pozzolans, calcined pozzolans, and fly ash. Additionally, the different types of cements may contain 5 wt.-% of additional inorganic, finely milled mineral compounds.

Burnt shale, especially burnt oil shale is obtained at temperatures of about 800° C. by burning of natural shale and subsequent milling.

The term "calcium aluminate cements" refers to cements that predominantly comprise $CaO \times Al_2O_3$. They can, e.g., be obtained by melting calcium oxide (CaO) or limestone ($CaCO_3$) and bauxite or aluminate together. Calcium aluminate cement comprises about 20 to 40% by weight of CaO, up to about 5% by weight of $SiO_2$, about 35 to 80% by weight of $Al_2O_3$ and up to about 20% by weight of $Fe_2O_3$. Calcium aluminate cements are defined according to DIN EN 14647 (January 2006).

The term "calcium sulfoaluminate cement" refers to a cement which contains calcium sulfoaluminate ($Ca_4(AlO_2)_6SO_4$) as well as calcium sulfate. Calcium sulfate may be provided as calcium sulfate dihydrate ($CaSO4 \times 2H2O$), calcium sulfate hemihydrate ($CaSO_4 \times ½H_2O$) and anhydrite ($CaSO_4$). Natural occurring gypsum is $CaSO_4 \times 2H_2O$. However, burnt gypsum can be in a variety of hydration states according to the generic formula $CaSO_4 \times nH_2O$, with $0 \le n < 2$.

Furthermore, various additives may be used according to the present invention. In a preferred embodiment, the at least one additive is selected from the group consisting of grinding aids, fillers, accelerators, retarders, rheology modifiers, plasticizers, fibers, alkaline activators, surfactants, and mixtures thereof.

Grinding aids are typically chemicals that coat the newly formed surfaces of broken mineral particles and prevent re-agglomeration. They include 1,2-propanediol, acetic acid, triethanolamine, lignosulfonates and polycarboxylate ethers. Typically, grinding aids are added at a rate of 0.01-0.03 wt.-%.

Rheology modifiers adjust the viscosity and thus the flow behavior and ensure a good balance between consistency, durability and application properties. These modifiers can be based on synthetic polymers (e.g. acrylic polymers), cellulose, silica, starches or clays.

Plasticizers are polymers that function as dispersant to avoid particle segregation and improve the rheology and thus workability of suspensions. Plasticizers generally can be divided into four categories: lignosulfonates, melamine sulfonates, naphthalene sulfonates, and comb polymers (e.g. polycarboxylate ethers, polyaromatic ethers, cationic copolymers, and mixtures thereof).

The setting time can be prolonged/shortened by the addition of certain compounds called retarders/accelerators. Retarders can be divided into the groups of lignosulfonates, cellulose derivatives, hydroxyl carboxylic acids, organophosphates, synthetic retarders, and inorganic compounds. Non-limiting examples of retarders are hydroxyethyl cellulose, carboxymethyl hydroxyethyl cellulose, citric acid, tartaric acid, gluconic acid, glucoheptonate, maleic anhydride, 2-Acrylamido-2-methylpropanesulfonic acid (AMPS) copolymers, borax, boric acid, and ZnO. Non-limiting examples of accelerators are $CaCl_2$, KCl, $Na_2SiO_3$, NaOH, $Ca(OH)_2$, and $CaO \times Al_2O_3$, lithium silicate, potassium silicate, and aluminum salts, such as aluminum sulfate.

Fibers (or stabilizing fibers) can be added to the inorganic binder system to further increase the stability. Such fiber can be made of a variety of materials, such as rock (e.g. basalt), glass, carbon, organic polymers (e.g. polyethylene, polypropylene, polyacrylonitrile, polyamides, and polyvinyl alcohols), cellulose, lignocellulose, metals (e.g. iron or steel), and mixtures thereof. Organic fibers are preferred. The amount of the fibers can be up to 3 wt.-%, preferably from 0.1 to 2 wt.-%, more preferably 0.1 to 1.5 wt.-%, even more preferably 0.1 to 1 wt.-% and in particular 0.2 to 0.7 wt.-%, based on the inorganic binder system. The fibers preferably have a length of up to 200 mm or up to 120 mm, preferably up to 100 mm, more preferably up to 50 mm, most preferably up to 25 mm and in particular up to 20 mm, and a diameter of up to 100 μm.

The term "filler" refers primarily to materials that can be added to increase the volume without impairing the properties of the inorganic binder system. The fillers mentioned can be selected from the group consisting of quartz sand or powdered quartz, calcium carbonate, rock flour, low-density fillers (for example vermiculite, perlite, diatomaceous earth, mica, talc powder, magnesium oxide, foamed glass, hollow spheres, foam sand, clay, polymer particles), pigments (e.g. titanium dioxide), high density fillers (e.g. barium sulphate), metal salts (e.g. zinc salts, calcium salts, etc.), and mixtures thereof. Grain sizes suitable here are in particular up to 500 μm. It is particularly preferable that the average grain size is up to 300 μm, preferably up to 150 μm.

Suitable amounts of the additives may vary over a broad range and also depend on the type of additive. Typically, the at least one additive is provided in weight percent amount of from 0.0003 to 30 wt.-%, or of from 0.03 to 25 wt.-%, based on the total weight of the inorganic binder. However, fillers may also be used in higher amounts.

The present invention is further directed to a process for the manufacture of the inorganic binder system comprising co-grinding a mixture comprising
(i) the blast furnace slag, and
(ii) the at least one solid alkali metal silicate,
and optionally mixing the obtained co-ground mixture with at least one additional inorganic binder and/or at least on additive, to obtain the inorganic binder system.

In a preferred embodiment, the process comprises co-grinding for at least two minutes using a planetary ball mill.

In a preferred embodiment, at least one additive is mixed with the co-ground powder. The at least one additive may also be mixed with either the blast furnace slag and/or the at least one solid alkali metal silicate having the empirical formula m $SiO_2$.n $M_2O$ prior to co-grinding.

The present invention is further directed to an inorganic binder system, obtained according to the process for the manufacture of the inorganic binder system comprising co-grinding a mixture comprising
(i) the blast furnace slag, and
(ii) the at least one solid alkali metal silicate having the empirical formula m $SiO_2$.n $M_2O$, wherein M is selected from the group consisting of Li, Na, K and mixtures thereof, and optionally mixing the obtained co-ground mixture with at least one additional inorganic binder and/or at least one additive, to obtain the inorganic binder system.

The present invention is further directed to the use of the inorganic binder system according to the present invention for improving the mechanical properties and/or the durability of construction materials.

The present invention is further directed to the use of the inorganic binder system for improving the mechanical properties and/or the durability of construction materials, the inorganic binder system is obtained according to the process for the manufacture of the inorganic binder system comprising co-grinding a mixture comprising
(i) the blast furnace slag, and
(ii) the at least one solid alkali metal silicate having the empirical formula m $SiO_2$.n $M_2O$, wherein M is selected from the group consisting of Li, Na, K and mixtures thereof, and optionally mixing the obtained co-ground mixture with at least one additional inorganic binder and/or at least one additive, to obtain the inorganic binder system.

The present invention is further directed to the use of the inorganic binder system according to the present invention as or as a constituent of building material formulations and/or building products such as concrete, finished concrete parts, concrete goods, concrete blocks and also on-site concrete, sprayed concrete, ready-mixed concrete, building adhesives and thermal insulation composite system adhesives, concrete repair systems, one-component and two-component sealing slurries, screeds, knifing fillers and self-levelling compositions, tile adhesives, plasters and renders, adhesives and sealants, coating systems, in particular for tunnels, wastewater channels, spray protection and condensate lines, dry mortars, joint grouts, drainage mortars and/or repair mortars.

The present invention is further directed to the use of the inorganic binder system as or as a constituent of building material formulations and/or building products such as concrete, finished concrete parts, concrete goods, concrete blocks and also on-site concrete, sprayed concrete, ready-mixed concrete, building adhesives and thermal insulation composite system adhesives, concrete repair systems, one-component and two-component sealing slurries, screeds, knifing fillers and self-levelling compositions, tile adhesives, plasters and renders, adhesives and sealants, coating systems, in particular for tunnels, wastewater channels, spray protection and condensate lines, dry mortars, joint grouts, drainage mortars and/or repair mortars, the inorganic binder system is obtained according to the process for the manufacture of the inorganic binder system comprising co-grinding a mixture comprising
(i) the blast furnace slag, and
(ii) the at least one solid alkali metal silicate having the empirical formula m $SiO_2$.n $M_2O$, wherein M is selected from the group consisting of Li, Na, K and mixtures thereof, and optionally mixing the obtained co-ground mixture with at least one additional inorganic binder and/or at least one additive, to obtain the inorganic binder system.

The present invention is further directed to a cement, mortar or concrete containing the inorganic binder system according to the present invention.

The present invention is further directed to a cement, mortar or concrete containing the inorganic binder system, the inorganic binder system is obtained according to the process for the manufacture of the inorganic binder system comprising co-grinding a mixture comprising
(i) the blast furnace slag, and
(ii) the at least one solid alkali metal silicate having the empirical formula m $SiO_2$.n $M_2O$, wherein M is selected from the group consisting of Li, Na, K and mixtures thereof, and optionally mixing the obtained co-ground mixture with at least one additional inorganic binder and/or at least one additive, to obtain the inorganic binder system.

The present invention is further illustrated by the following non-limiting examples.

EXAMPLES

Sample Preparation

All dry substances are first homogenized and then mixed with water. The mixing is done with a drill and a disc stirrer at medium speed. The mixture is first stirred for about one minute until a homogeneous mass is obtained. After allowing the mixture to stand for three minutes, the mixture is stirred up again and applied in to a mold, so that specimens having 20 mm in diameter and 40 mm height are obtained. The mold is covered to prevent drying. The specimens are removed from the mold after storage for 24 hours (at 23° C.) and then stored for further 6 days (at 23° C. and 50% relative humidity). After a total of seven days, resistance tests are carried out on the specimens.

Resistance Tests

For resistance tests, a specimen is weighed and placed in a plastic bottle (250 ml) filled with 200 g of a medium. 50 g of coarse quartz sand is added to the bottle to provide abrasion during the test. Thereafter, the bottle is rotated for 2.5 hours in an overhead mixer. The specimen is then removed from the bottle, dried and weighed again. The percentage of mass before and after the resistance test is used to assess the resistance. The resistance is tested in three media: water, 1 molar NaOH and 1 molar HCl.

Example 1

In Example 1, two reference mortars were prepared with the ingredients shown in Table 1.

TABLE 1

| (all ingredient units are given in grams) | | |
| --- | --- | --- |
| Ingredients | M1 | M2 |
| Blast furnace slag | 150 | 150 |
| Metakaolin | 90 | 90 |
| Quartz sand | 622 | 639 |
| Sodium water glass (modulus 1.0) | 23 | 6 |
| Potassium water glass (modulus 3.6) | 115 | |
| Potassium water glass (modulus 2.4) | | 115 |
| Water | 250 | 200 |

Example 2

In Example 2, the potassium water glass used for references M1 and M2 was co-ground with the blast furnace slag used for references M1 and M2 for two minutes using a planetary ball mill. The obtained co-ground powder was then used in the formulations M1a and M2a shown in Table 2.

TABLE 2

| (all ingredient units are given in grams) | | |
| --- | --- | --- |
| Ingredients | M1a | M2a |
| Metakaolin | 90 | 90 |
| Quartz sand | 622 | 639 |

TABLE 2-continued

| (all ingredient units are given in grams) | | |
| --- | --- | --- |
| Ingredients | M1a | M2a |
| Sodium water glass (modulus 1.0) | 23 | 6 |
| Co-ground potassium water glass (modulus 3.6) including blast furnace slag | 265 | |
| Co-ground potassium water glass (modulus 2.4) including blast furnace slag | | 265 |
| Water | 250 | 200 |

The resistances are shown in Table 3. Particularly, the resistances in NaOH significantly increased from 11% (M1) to 90% (M1a), as well as from 13% (M2) to 96% (M2a).

TABLE 3

| Medium | M1 | M1a | M2 | M2a |
| --- | --- | --- | --- | --- |
| 1M HCl | 88% | 88% | 96% | 96% |
| 1M NaOH | 11% | 90% | 13% | 96% |
| Water | 23% | 95% | 42% | 98% |

The invention claimed is:

1. An inorganic binder system comprising
(i) blast furnace slag, wherein the blast furnace slag comprises from 30 to 45% by weight of CaO, 4 to 17% by weight of MgO, 30 to 45% by weight of $SiO_2$, and 5 to 15% by weight of $Al_2O_3$, and
(ii) at least one solid alkali metal silicate having the empirical formula m $SiO \cdot n$ $M_2O$,
wherein M is selected from the group consisting of Li, Na, K and mixtures thereof, and wherein the inorganic binder system is obtained by co-grinding a mixture comprising the blast furnace slag and the at least one solid alkali metal silicate.

2. The inorganic binder system according to claim 1, wherein the molar ratio of m:n is ≤4.0.

3. The inorganic binder system according to claim 1, wherein the weight ratio of the blast furnace slag and the at least one solid alkali metal silicate is in the range from 500:1 to 1:5.

4. The inorganic binder system according to claim 1, having a Blaine value in the range from 200 to 1000 $m^2/kg$, as determined according to DIN EN 196-6.

5. The inorganic binder system according to claim 1, wherein co-grinding is performed using a ball mill, a planetary mill, a disc mill, a rotor mill, a vertical mill or a mortar grinder.

6. The inorganic binder system according to claim 1, wherein the blast furnace slag is granulated blast furnace slag or ground granulated blast furnace slag.

7. The inorganic binder system according to claim 1, further comprising at least one additional inorganic binder selected from the group consisting of hydraulic binders, latent hydraulic binders, pozzolanic binders and mixtures thereof.

8. The inorganic binder system according to claim 7, wherein the pozzolanic binder is selected from the group consisting of precipitated silica, pyrogenic silica, micro-silica, ground glass, brown coal fly ash, mineral coal fly ash, metakaolin, pozzolana, tuff, trass, volcanic ash, natural and synthetic zeolites and mixtures thereof.

9. The inorganic binder system according to claim 1, wherein the inorganic binder system further comprises at least one additive.

10. The inorganic binder system according to claim 2, wherein the molar ratio of m:n is ≤3.8.

11. The inorganic binder system according to claim 3, wherein the weight ratio of the blast furnace slag and the at least one solid alkali metal silicate is in the range from 30:1 to 1:1.

12. The inorganic binder system according to claim 9, wherein the at least one additive is selected from the group consisting of grinding aids, fillers, accelerators, retarders, rheology modifiers, plasticizers, fibers, alkaline activators, surfactants and mixtures thereof.

13. A process for the manufacture of the inorganic binder system as defined in claim 1, comprising co-grinding a mixture comprising
   (i) the blast furnace slag, wherein the blast furnace slag comprises from 30 to 45% by weight of CaO, 4 to 17% by weight of MgO, 30 to 45% by weight of $SiO_2$, and 5 to 15% by weight of $Al_2O_3$, and
   (ii) the at least one solid alkali metal silicate,
   and optionally mixing the obtained co-ground mixture with at least one additional inorganic binder and/or at least one additive, to obtain the inorganic binder system.

14. The process according to claim 13, wherein the co-grinding is performed using a ball mill, a planetary mill, a disc mill, a rotor mill, a vertical mill or a mortar grinder.

15. The process according to claim 13, wherein co-grinding is performed until the co-ground mixture has a Blaine value in the range from 200 to 1000 $m^2/kg$, as determined according to DIN EN 196-6.

16. An inorganic binder system, obtained according to the process according to claim 1.

17. A construction material formulation and/or building product comprising the inorganic binder system as defined in claim 1.

18. The construction material formulation and/or building product of claim 17 wherein the construction material formulation and/or building product is selected from the group consisting of concrete, finished concrete parts, concrete goods, concrete blocks, on-site concrete, sprayed concrete, ready-mixed concrete, building adhesives and thermal insulation composite system adhesives, concrete repair systems, one-component and two-component sealing slurries, screeds, knifing fillers and self-levelling compositions, tile adhesives, plasters and renders, adhesives and sealants, coating systems, dry mortars, joint grouts, drainage mortars, repair mortars and mixtures thereof.

19. A cement, mortar or concrete containing the inorganic binder system as defined in claim 1.

* * * * *